(12) United States Patent
Knussman et al.

(10) Patent No.: US 9,677,572 B2
(45) Date of Patent: Jun. 13, 2017

(54) METHOD AND SYSTEM FOR STORING AND REUSING HYDRAULIC ENERGY

(71) Applicant: Caterpillar Inc., Peoria, IL (US)

(72) Inventors: Michael L. Knussman, East Peoria, IL (US); Jeremy T. Peterson, Washington, IL (US); Jeffrey L. Kuehn, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/981,977

(22) Filed: Dec. 29, 2015

(65) Prior Publication Data

US 2016/0108933 A1  Apr. 21, 2016

(51) Int. Cl.
*F15B 21/14* (2006.01)
*F15B 1/02* (2006.01)
*F15B 1/027* (2006.01)

(52) U.S. Cl.
CPC .............. *F15B 1/024* (2013.01); *F15B 1/027* (2013.01); *F15B 21/14* (2013.01); *F15B 2211/20546* (2013.01); *F15B 2211/212* (2013.01); *F15B 2211/3058* (2013.01); *F15B 2211/41572* (2013.01); *F15B 2211/761* (2013.01); *F15B 2211/88* (2013.01); *Y02P 80/13* (2015.11)

(58) Field of Classification Search
CPC ........... F15B 1/024; F15B 21/14; F15B 1/027
USPC .......................................................... 60/414
See application file for complete search history.

(56) References Cited

U.S. PATENT DOCUMENTS

| 6,434,864 | B1* | 8/2002 | Epshteyn ............. E02F 9/2217 37/428 |
|---|---|---|---|
| 7,269,944 | B2* | 9/2007 | Zhang .................. E02F 9/2217 60/414 |
| 7,325,398 | B2* | 2/2008 | Cherney ............... E02F 9/2217 60/414 |
| 7,444,809 | B2 | 11/2008 | Smith et al. |
| 7,775,040 | B2 | 8/2010 | Khalil |
| 7,823,379 | B2 | 11/2010 | Hamkins et al. |
| 2013/0133966 | A1* | 5/2013 | Jiang ........................ B66F 9/22 180/165 |

* cited by examiner

Primary Examiner — Thomas E Lazo

(57) ABSTRACT

A method for storing and reusing hydraulic energy in a machine is disclosed. The method includes transferring the hydraulic energy from an actuator to an upstream side of a motor pump via a first valve, during a normal mode. The method includes directing excess hydraulic energy from a downstream side of the motor pump to an accumulator by opening an accumulator valve and closing a bypass valve, during an energy saving mode. The method includes retrieving stored hydraulic energy from the accumulator to the upstream side of the motor pump by opening the accumulator valve, during an energy discharging mode.

1 Claim, 5 Drawing Sheets

METHOD AND SYSTEM FOR STORING AND REUSING HYDRAULIC ENERGY

TECHNICAL FIELD

The present disclosure relates to hydraulic systems utilized in heavy machines, and more specifically, to a method and system for storing and reusing hydraulic energy.

BACKGROUND

Heavy machines, such as a track type tractor, wheel loader, etc. are utilized across a variety of industries, such as agriculture, construction, mining, etc. Such machines are utilized for a variety of tasks, such as for excavating, hauling, pushing material, and dumping excavated material. Such machines employ hydraulic systems that convert hydraulic energy into a mechanical motion to operate various components.

Currently, there have been challenges in managing hydraulic energy within a hydraulic system. For example, the hydraulic energy (i.e. hydraulic fluid) is transferred through a loop using additional components that are integrated with the hydraulic system. Examples of the additional components include, but are not limited to, an open loop pump, a make-up accumulator, a charge pump, etc. As a result, the additional components tend to increase an overall cost of the hydraulic system. Further the additional components degrade operational efficiency of the hydraulic system. As a consequence, the current systems and/or techniques are not cost effective and are unviable.

U.S. Pat. No. 7,823,379 B2, hereinafter referred to as '379 reference, discloses various modes for reusing recovered energy for a hydraulic system. The hydraulic energy is produced by an overrunning load acting on cylinders connected in parallel to a machine component. In a first mode, fluid from first chambers in both cylinders is routed into the accumulator, while other fluid is directed into second chambers of those cylinders. In a second mode, the fluid is routed from the first chamber of only one cylinder into the accumulator, and fluid from the first chamber of the other cylinder goes into the second chambers of both cylinders. In a third mode, fluid is routed from the first chambers of both cylinders into the second chambers of both cylinders. Further, in a fourth mode, the fluid from the first chambers of both cylinders goes into the return conduit, while the second chambers of both cylinders receive fluid from a supply conduit. However, the '379 reference fails to disclose regeneration of the hydraulic energy. Therefore, there is a need for a method and system for storing and reusing the hydraulic energy.

SUMMARY OF THE INVENTION

In one aspect of the present disclosure, a method for storing and reusing hydraulic energy in a machine is disclosed. The method includes transferring the hydraulic energy from an actuator to an upstream side of a motor pump via a first valve, during a normal mode. The method includes directing excess hydraulic energy from a downstream side of the motor pump to an accumulator by opening an accumulator valve and closing a bypass valve, during an energy saving mode. The method includes retrieving stored hydraulic energy from the accumulator to the upstream side of the motor pump by opening the accumulator valve, during an energy discharging mode.

Other features and aspects of this disclosure will be apparent from the following description and the accompanying drawings.

DETAILED DESCRIPTION

Figure 1:
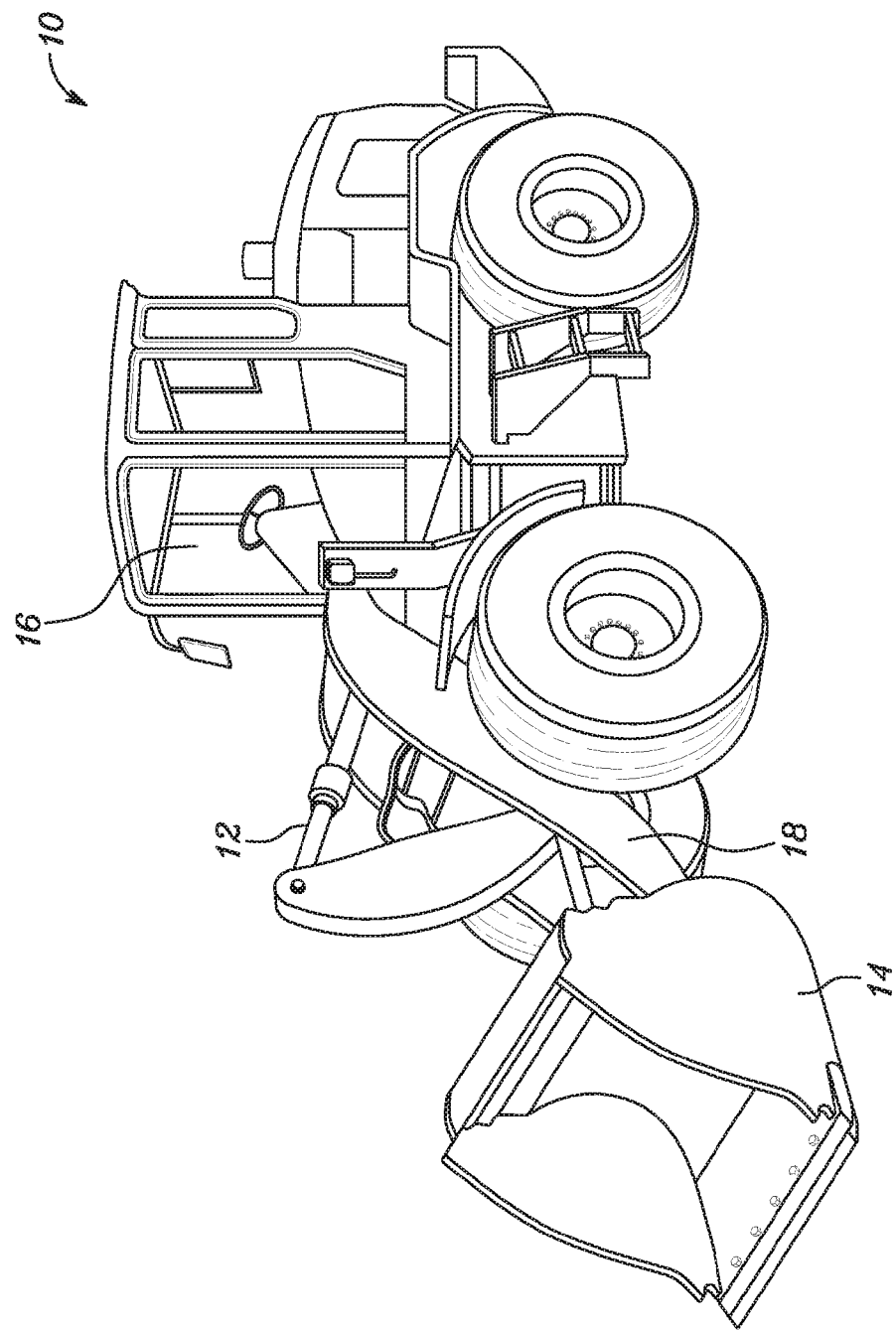
FIG. 1 illustrates a machine utilizing a hydraulic system to store and reuse hydraulic energy, in accordance with the concepts of the present disclosure.

FIG. 1 illustrates a machine 10 utilizing a hydraulic system to store and reuse hydraulic energy, in accordance with the concepts of the present disclosure. The machine 10 includes a hydraulic component 12, a bucket 14, a cabin 16, a boom 18, etc. The machine 10 may include various other components, such as an actuator, a valve, an engine, transmission, a tank, a controller, a display device, and so on (not shown). For the purpose of simplicity, the various other components of the machine 10 are not labeled in FIG. 1. Examples of the machines 10 include, but not limited to, a wheel loader, a track-type tractor, etc.

The machine 10 is utilized for a variety of tasks, such as for excavating, hauling, scraping, pushing materials, etc. A user is capable for operating the machine 10 for a variety of purposes. The user may be a worker, an operator, a technician, or any maintenance personnel capable of operating the machine 10. The hydraulic component 12 converts a hydraulic energy into a mechanical energy by complying with the law of conservation of energy to operate various components of the machine 10. The machine 10 utilizes current hydraulic method and/or system for storing and reusing of the hydraulic energy as described in various embodiments of the disclosure.

Figure 2:
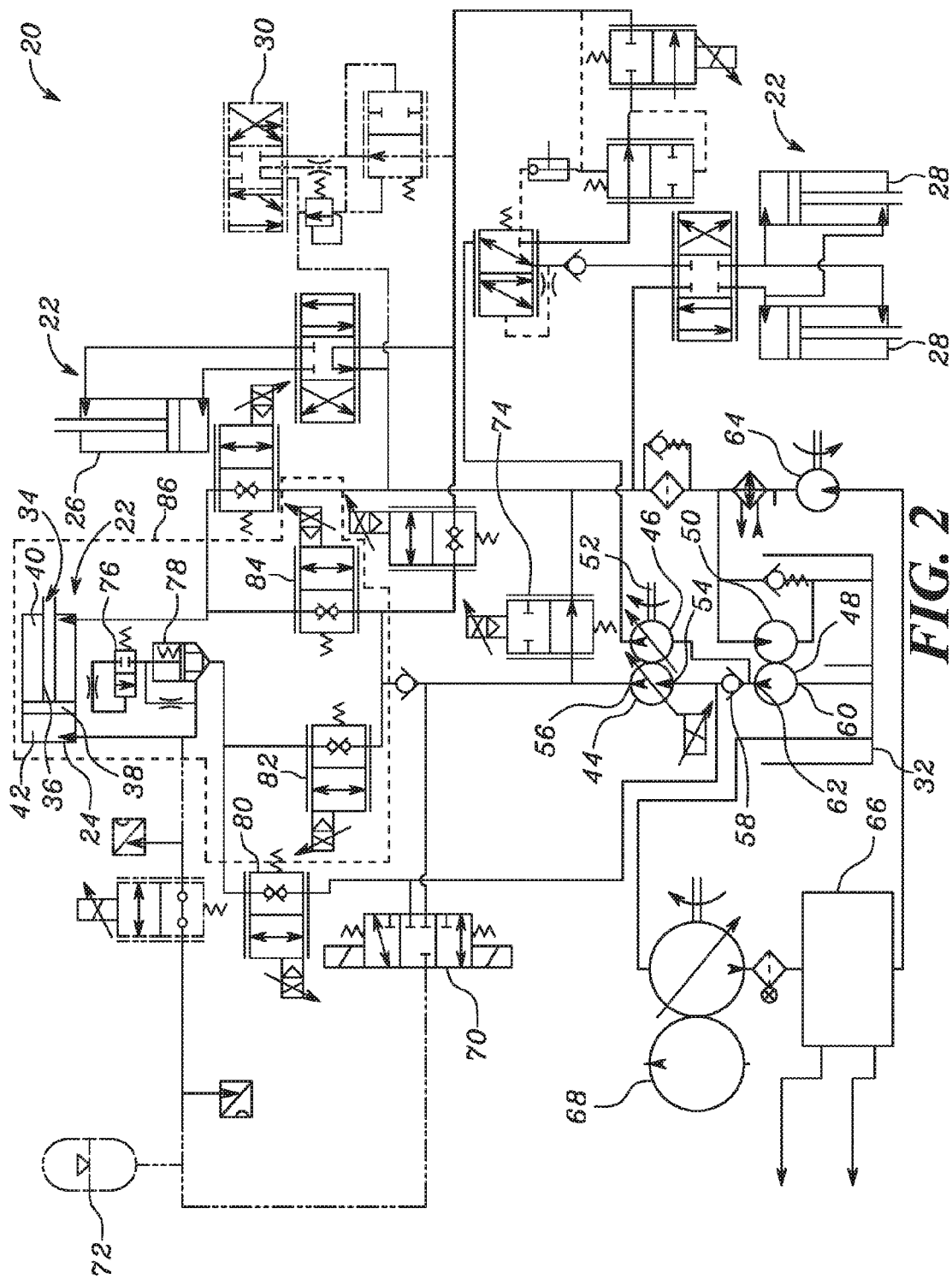
FIG. 2 illustrates a circuit diagram of a hydraulic circuit of the hydraulic system of FIG. 1, in accordance with the concepts of the present disclosure.

FIG. 2 illustrates a circuit diagram of a hydraulic circuit 20 of the hydraulic system of FIG. 1, in accordance with the concepts of the present disclosure. For the purpose of simplicity, the various components of the hydraulic circuit 20 are not labeled and described in FIG. 2. The term "hydraulic fluid" (or fluid) and "hydraulic energy" may be interchangeably used within the specification without departing from the meaning and scope of the disclosure. The term "inlet" and "upstream side" may be interchangeably used within the specification and similarly, the term "outlet" and "downstream side" may be interchangeably used within the specification without departing from the meaning and scope of the disclosure. The machine 10 performs various functions by one or more hydraulic actuators 22. For example, a lift cylinder 24, a tilt cylinder 26, a pair of steering cylinders 28. An auxiliary circuit 30 is utilized for carrying out various auxiliary functions of the machine 10. The hydraulic actuators 22 are adapted to convert hydraulic energy of hydraulic fluid into mechanical energy. The hydraulic actuators 22 are adapted to draw hydraulic fluid (also called fluid) from a reservoir 32. The hydraulic fluid is drawn from the reservoir 32 to a boost pump 48 via its inlet 60. The hydraulic fluid is further transferred to a motor pump 44 from an outlet 62 of the boost pump 48 by opening a check valve 58. The motor pump 44 then transfers hydraulic fluid to extend various hydraulic actuators 22 including the lift cylinder 24, the tilt cylinder 26 and the pair of steering cylinders 28. The reservoir 32 holds sufficient fluid to meet demands of the hydraulic actuators 22 and other hydraulic components of the hydraulic circuit 20.

According to an embodiment, the lift cylinder 24 is a double acting hydraulic cylinder. The lift cylinder 24 is adapted to lift a predetermined load by operating various components of the machine 10. The lift cylinder 24 has a piston 34 that reciprocates within the lift cylinder 24. The piston 34 includes a rod 36 coupled to a plug 38 on one side and coupled to an element, such as an implement or tool of the machine 10 on the other side. The plug 38 of the piston 34 divides the lift cylinder 24 into two chambers, a rod end chamber 40 and a head end chamber 42. The rod end chamber 40 corresponds to that portion of the lift cylinder 24 that includes the rod 36 and the head end chamber 42 corresponds to that portion of the lift cylinder 24 that does not include the rod 36. The volumes of the rod end chamber 40 and the head end chamber 42 varies as the piston 34 reciprocates within the lift cylinder 24. Both the head end chamber 42 and the rod end chamber 40 are adapted to receive and discharge the hydraulic fluid so as to create a pressure difference between both the chambers.

The hydraulic circuit 20 further includes the motor pump 44, a combination of the boost pump 48 and a boost motor 50. The motor pump 44 is coupled to a pump 46. According to an embodiment, the motor pump 44 and the pump 46 have a variable displacement capacity. The pump 46 is operatively coupled to a shaft 52. The motor pump 44 has an upstream side 54 and a downstream side 56. The upstream side 54 of the motor pump 44 is coupled to the boost pump 48 through a check valve 58. The boost pump 48 has an inlet 60 and an outlet 62. The boost pump 48 is connected to the reservoir 32 via the inlet 60 and is connected to the check valve 58 via the outlet 62. The check valve 58 is adapted to allow the hydraulic fluid to flow in one direction i.e. from the outlet 62 of the boost pump 48 to the upstream side 54 of the motor pump 44. The boost pump 48 is coupled to the boost motor 50. The boost motor 50 is further coupled to a fan motor 64. The fan motor 64 is coupled to a brake supply valve 66. The brake supply valve 66 is coupled to a transmission pump 68.

The motor pump 44 is connected to an accumulator valve 70. The accumulator valve 70 is further coupled to an accumulator 72. The accumulator 72 stores excess hydraulic fluid (also called unused hydraulic energy) as described in FIG. 3. In an embodiment, the accumulator valve 70 is a three position valve. The three positions are a top position, a middle position, and a bottom position. The middle position is the normal position of the three way valve. The top position and the bottom position are the operated positions of the three way valve. The accumulator valve 70 is operated in such a way that it is adapted to receive and discharge the hydraulic fluid between the accumulator 72 and the motor pump 44. The motor pump 44 is coupled to a bypass valve 74. The bypass valve 74 is a two position valve.

A hydraulic valve 76 is adapted to transmit the hydraulic fluid from the head end chamber 42 of the lift cylinder 24 to an element 78. The element 78 is connected to a first valve 80 and a hydraulic valve 82. The hydraulic valve 82 is further connected to a hydraulic valve 84. The hydraulic valve 84 is connected to the rod end chamber 40 of the lift cylinder 24. The lift cylinder 24, the hydraulic valve 76, the element 78, the hydraulic valve 82, and the hydraulic valve 84 together form a regeneration circuit 86. According to an embodiment, the first valve 80, the hydraulic valve 82, and the hydraulic valve 84 are two position valves.

During a normal mode, the lift cylinder 24 is in an overrunning load condition. The overrunning load condition on the lift cylinder 24 may exist when the lift cylinder 24 is desired to be retracted after the lift cylinder 24 has been extended by the machine 10. The lift cylinder 24 may be retracted by a force of gravity on the machine 10. During retraction, the piston 34 of the lift cylinder 24 moves in the direction of the head end chamber 42. As a result, the volume of the head end chamber 42 decreases and the volume of the rod end chamber 40 increases. During the normal mode, there is an opportunity to capture the potential energy available with the machine 10, convert the potential energy to the hydraulic energy, re-circulate the pressurized hydraulic fluid to the motor pump 44, and use it to rotate the shaft 52 to drive powertrain of the machine 10.

According to an embodiment, when the lift cylinder 24 retracts, the hydraulic fluid is drawn from the head end chamber 42 of the lift cylinder 24. The hydraulic valve 76 and the element 78 are shifted to an open position to allow the hydraulic fluid to pass through the first valve 80. The first valve 80 is opened to receive the hydraulic fluid and transfer the hydraulic fluid to the upstream side 54 of the motor pump 44. The motor pump 44 uses the available hydraulic energy of the hydraulic fluid to drive the powertrain of the machine 10 by opening the bypass valve 74. The motor pump 44 transfers the hydraulic energy to the pump 46 to rotate the shaft 52. Thereafter, the shaft 52 transfers the hydraulic energy to drive the powertrain of the machine 10.

According to an embodiment, the regeneration circuit 86 is used to enhance the retraction of the lift cylinder 24. A portion of the hydraulic fluid in the head end chamber 42 of the lift cylinder 24 is transferred directly to the rod end chamber 40 of the lift cylinder 24 by using the regeneration circuit 86. A portion of the hydraulic fluid in the head end chamber 42 of the lift cylinder 24 is transferred by opening the hydraulic valve 76 via the element 78. The hydraulic valve 82 is opened to receive the hydraulic fluid. Thereafter, the hydraulic fluid is transferred to the rod end chamber 40 of the lift cylinder 24 by opening the hydraulic valve 84.

Figure 3:
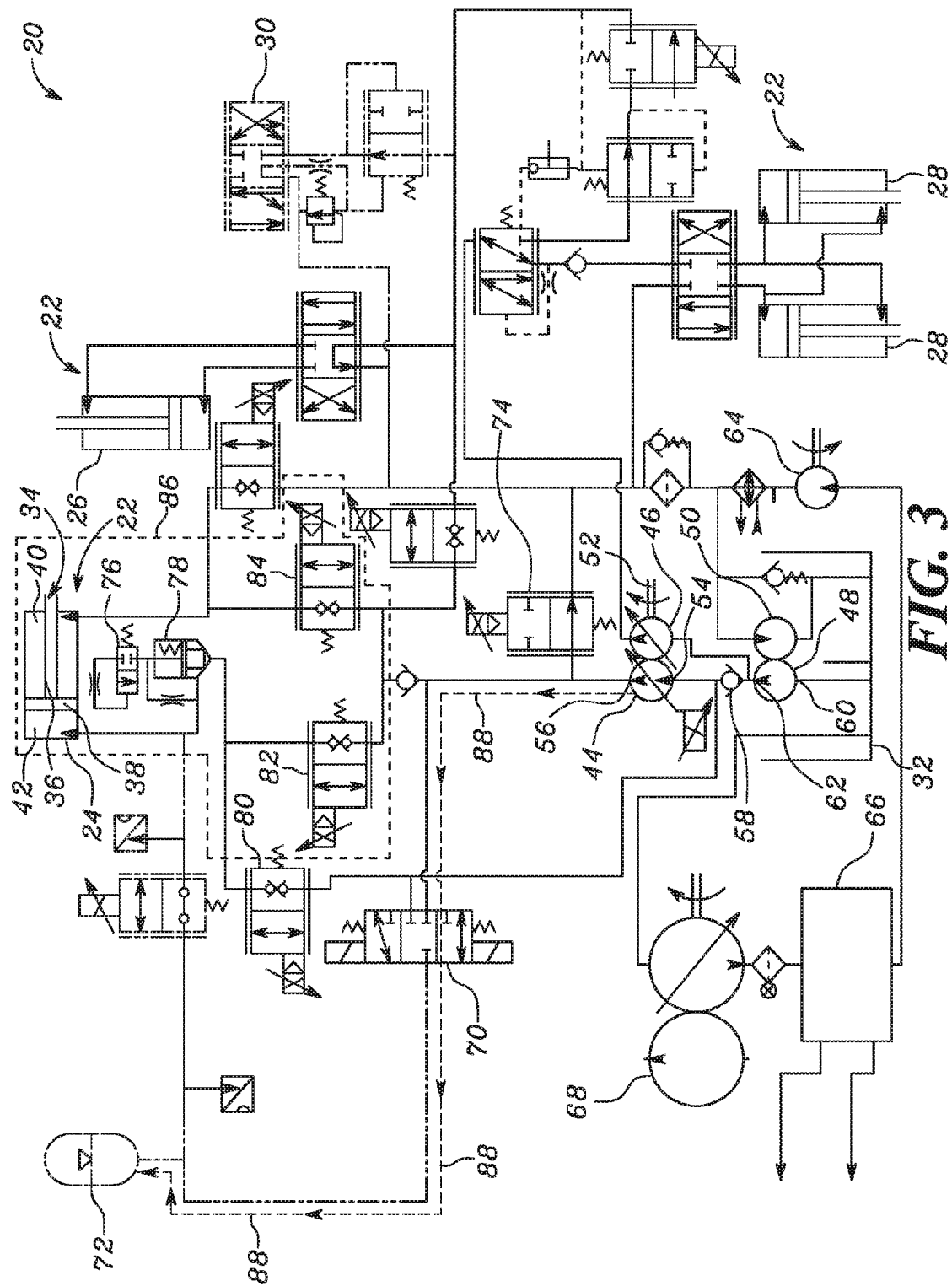
FIG. 3 illustrates fluid path during an energy saving mode, in accordance with the concepts of the present disclosure.

FIG. 3 illustrates a fluid path 88 during an energy saving mode, in accordance with the concepts of the present disclosure. The energy saving mode is achieved when the hydraulic fluid follows the fluid path 88. In an embodiment, when there is an excess hydraulic energy (or unused hydraulic energy) within the hydraulic circuit 20, the hydraulic circuit 20 stores unused hydraulic energy in the accumulator 72 for further reuse. Under this configuration, the excess hydraulic energy i.e. the energy not used by the shaft 52 to drive the powertrain instead it is adapted to be stored in the accumulator 72 for subsequent usage. This mode of operation is called the energy saving mode. The hydraulic circuit 20 directs the excess hydraulic energy from the downstream side 56 of the motor pump 44 to the accumulator 72 by opening the accumulator valve 70 and closing the bypass valve 74. As illustrated by the fluid path 88, the hydraulic fluid exits the downstream side 56 of the motor pump 44 towards the accumulator valve 70. The accumulator valve 70 is actuated to open in its bottom position to allow the hydraulic fluid to flow through the accumulator valve 70 towards the accumulator 72. Thereafter, the hydraulic fluid is stored in the accumulator 72 for subsequent usage.

Figure 4:
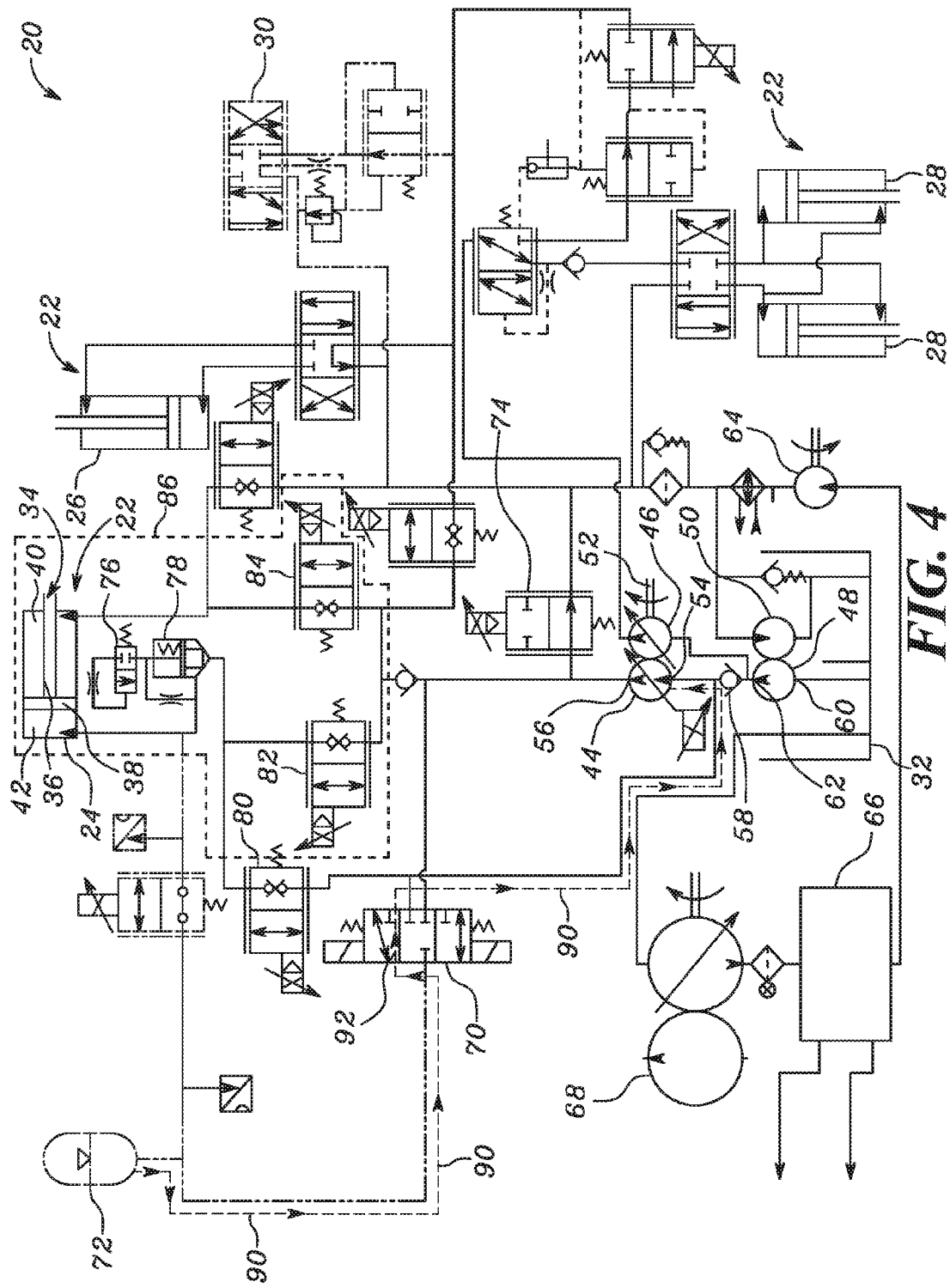
FIG. 4 illustrates a fluid path during an energy discharging mode, in accordance with the concepts of the present disclosure.

FIG. 4 illustrates a fluid path 90 during an energy discharging mode, in accordance with the concepts of the present disclosure. In an embodiment, when there is the excess hydraulic energy stored in the accumulator 72, the stored hydraulic energy (also called excess hydraulic energy) is used for running the powertrain of the machine 10. This mode of operation is called the energy discharging mode. The hydraulic circuit 20 retrieves the stored hydraulic energy from the accumulator 72 to the upstream side 54 of the motor pump 44 by actuating the accumulator valve 70 to open in its top position. The direction of flow of fluid within the accumulator valve 70 is routed from the top portion 92 via the fluid path 90.

According to an embodiment, the stored hydraulic energy in the accumulator 72 is reused in the energy discharging mode by assisting the motor pump 44 to extend the lift cylinder 24 so that the machine 10 may perform a work against the force of gravity. This condition on the lift cylinder 24 is known as the resistive load condition. The stored hydraulic fluid is released from the accumulator 72 and is received at the upstream side 54 of the motor pump 44. The hydraulic fluid is used by the motor pump 44 to extend the lift cylinder 24. The volume of the hydraulic fluid supplied by the accumulator 70 is less than the volume of the fluid required by the head end chamber 42 of the lift cylinder 24 to extend the lift cylinder 24. To make up for the difference of fluid volume, the hydraulic circuit 20 uses the boost pump 48 to force the hydraulic fluid to the upstream side 54 of the motor pump 44. The check valve 58 is adapted to direct the hydraulic fluid from the outlet 62 of the boost pump 48 to the upstream side 54 of the motor pump 44.

Figure 5:
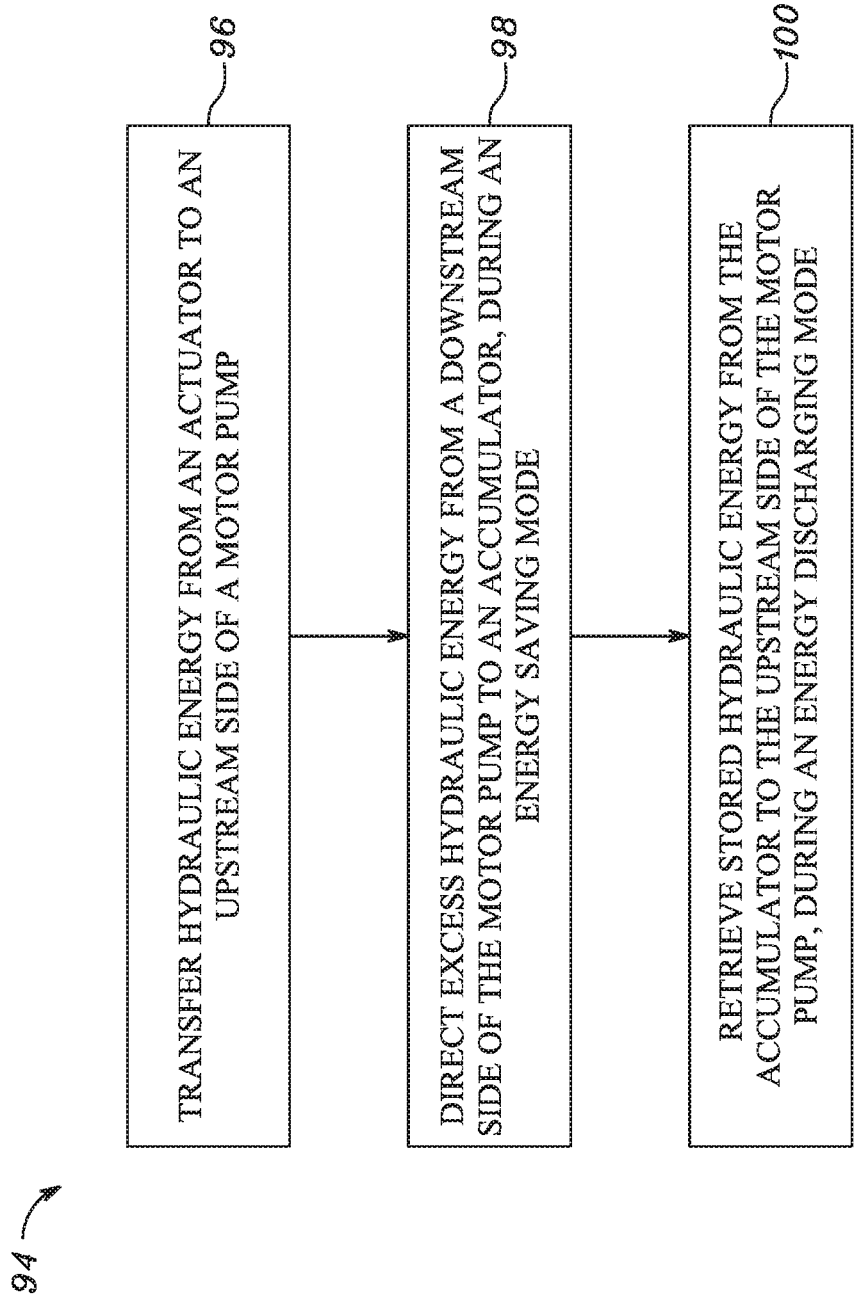
FIG. 5 illustrates a flowchart of a method for storing and reusing hydraulic energy, in accordance with the concepts of the present disclosure.

FIG. 5 illustrates a flowchart of a method 94 for storing and reusing hydraulic energy, in accordance with the concepts of the present disclosure. The method 94 is described in conjunction with FIG. 1-4.

At step 96, during a normal mode, the hydraulic energy (or hydraulic fluid) is transferred from an actuator, i.e. the lift cylinder 24 to the upstream side 54 of the motor pump 44 via the first valve 80.

At step 98, during an energy saving mode, directing excess hydraulic energy from the downstream side 56 of the motor pump 44 to the accumulator 72 by opening the accumulator valve 70 and closing the bypass valve 74.

At step 100, during an energy discharging mode, retrieving stored hydraulic energy from the accumulator 72 to the upstream side 54 of the motor pump 44 by opening the accumulator valve 70. The hydraulic energy is then utilized for operating the powertrain of the machine 10.

INDUSTRIAL APPLICABILITY

The hydraulic circuit 20 helps to effectively utilize hydraulic energy obtained during the normal mode. The hydraulic energy may be used to run the powertrain by transferring hydraulic energy through the shaft 52. During an energy saving mode, the excess hydraulic energy may be stored in the accumulator 72 without throttling by opening the accumulator valve 70 and closing the bypass valve 74. During an energy discharging mode, the energy stored in the accumulator 72 may be used to assist motor pump 44 in extending the lift cylinder 24. Since the hydraulic energy is retrieved from the accumulator 72 to the upstream side 54 of the motor pump 44, the motor pump 44 controls the flow rate of hydraulic fluid to the lift cylinder 24. There is no need of an additional throttling element to control the flow rate of the hydraulic fluid to the lift cylinder 24 while retrieving the hydraulic energy from the accumulator 72.

During the energy discharging mode, the hydraulic energy stored in the accumulator 72 may be utilized for various functions including propelling a direct drive machine; starting the engine without any extra cost following idle reduction. These functions reduce fuel consumption for the machine 10. Also, the hydraulic fluid in the accumulator 72 may serve as a boom suspension for smoothening the ride of the machine 10 and improving operator comfort. Also, the manufacturing cost of the boost pump 48 and the boost motor 50 is low. Since, the hydraulic losses across the check valve 58 are low when the hydraulic fluid flows to the upstream side 54 of the motor pump 44 from the outlet 62 of the boost pump 48, the boost pump 48 and the boost motor 50 may be manufactured from light weight materials.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for storing and reusing hydraulic energy in a machine, the method comprising:
    during a normal mode, transferring the hydraulic energy from an actuator to an upstream side of a motor pump via a first valve;
    during an energy saving mode, directing excess hydraulic energy from a downstream side of the motor pump to an accumulator by opening an accumulator valve and closing a bypass valve; and
    during an energy discharging mode, retrieving stored hydraulic energy from the accumulator to the upstream side of the motor pump by opening the accumulator valve.

* * * * *